United States Patent [19]

Narang

[11] 4,051,740

[45] Oct. 4, 1977

[54] SEGMENTAL V BELT

[76] Inventor: Rajendra K. Narang, 1525 Bonnie Road, Macedonia, Ohio 44056

[21] Appl. No.: 690,608

[22] Filed: May 27, 1976

[51] Int. Cl.² .......................... F16G 1/00; F16G 51/80
[52] U.S. Cl. ................................. 74/231 C; 74/231 J; 74/236
[58] Field of Search ..................... 74/236, 235, 231 C, 74/231 J

[56] References Cited
U.S. PATENT DOCUMENTS 2,663,194  12/1953  Ogard .................................... 74/236
2,984,120  5/1961   Hurry .................................. 74/231 C Primary Examiner—Leonard H. Gerin
Attorney, Agent, or Firm—Donnelly, Maky, Renner & Otto

[57] ABSTRACT

A segmental V belt consists of a plurality of body segments selectively joined to form an endless belt of any desired length. Such body segments, which can have sidewall perforations or formations to increase wear life, may be joined by connecting the exposed adjacent ends of reinforcing members otherwise embedded in the body segments, or by connecting the radially outer surfaces of the body segments to a reinforcement strip superimposed thereon.

18 Claims, 14 Drawing Figures

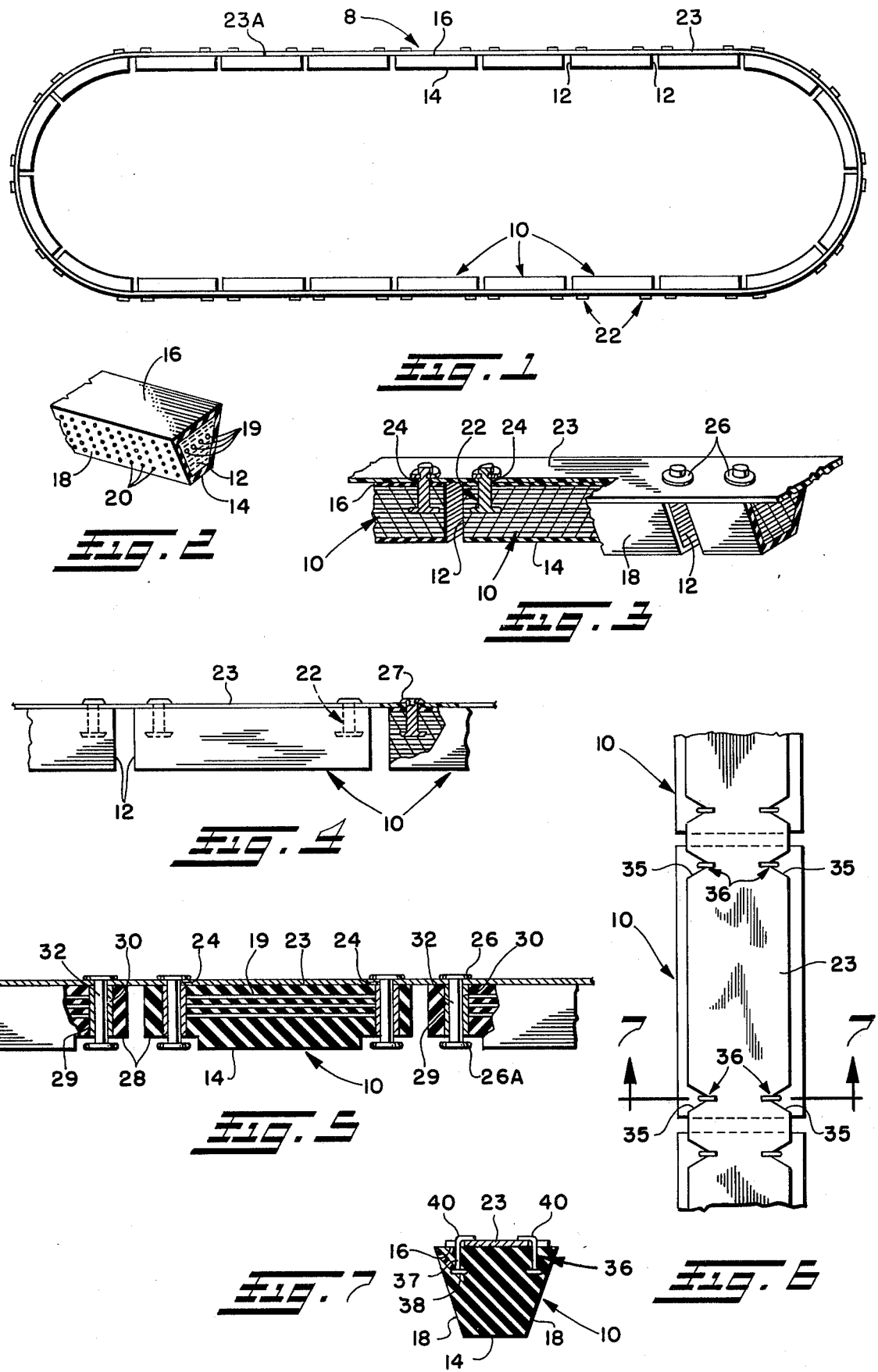

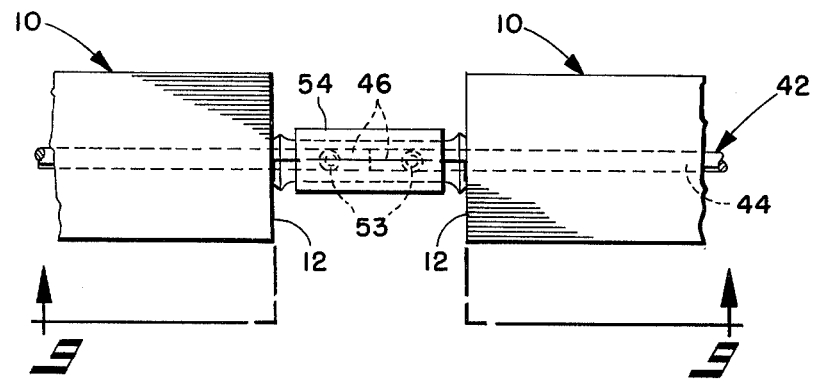
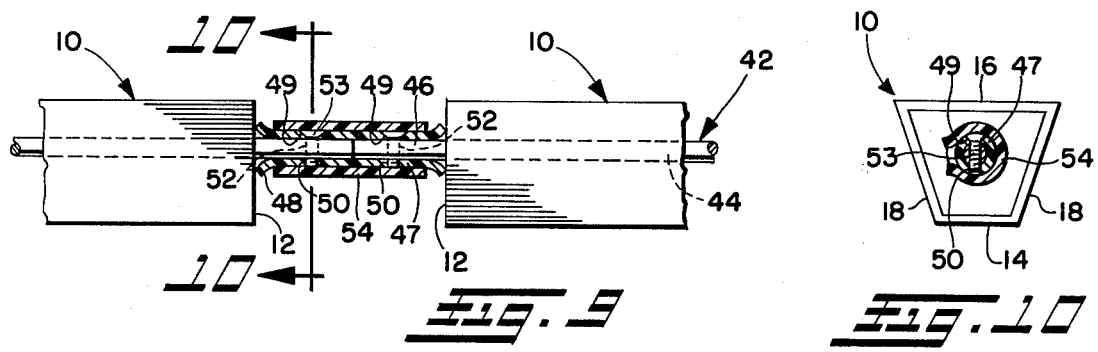
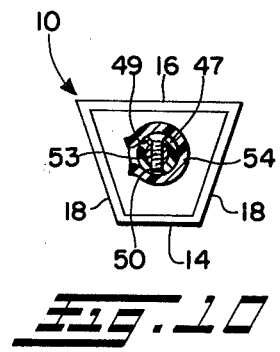
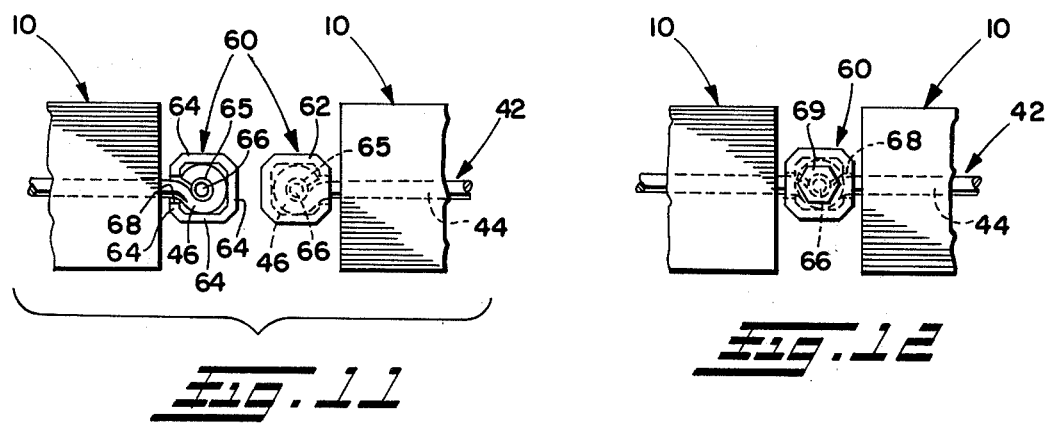
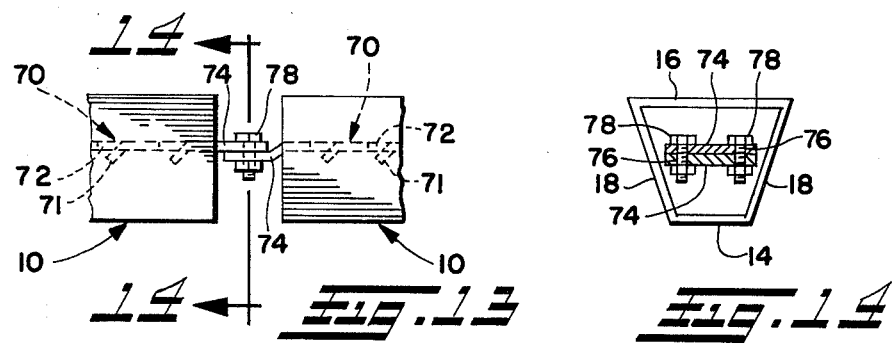

SEGMENTAL V BELT

BACKGROUND OF THE INVENTION

The present invention relates as indicated to segmental V belts in general and to reinforcement members in or on the segments selectively to interconnect the same in particular.

V belts are generally formed in a one piece endless configuration adapted to pass around a drive pulley and a driven pulley. Such belts are generally made with fabric and/or cord cores, which are generally encased in and vulcanized to a natural or synthetic rubber compounds. Such V belts are provided with continuous radially inner and radially outer surfaces and with inwardly converging tapered sidewalls which are received within and wedged against the sidewalls of the pulley grooves. An example of an endless belt with internal reinforcement and a plurality of tapered sidewalls is disclosed in White U.S. Pat. No. 3,853,017. Other endless V belts formed from linear bodies spliced at their ends are disclosed, for example, in Lawson U.S. Pat. No. 3,783,704, Gusdorf U.S. Pat. No. 1,457,569, Tolman U.S. Pat. No. 1,706,367, Argy U.S. Pat. No. 2,350,861, Dahlstrom U.S. Pat. No. 2,309,305 and Elvin U.S. Pat. No. 2,543,903. Other commercially available linear or endless V belts are disclosed in Worthington's "Mechanical Power Transmission Equipment Manual", copyright 1963.

Frequently, V belts are installed in locations that are difficult to reach because of interfering structure. Also, occasionally it is difficult to move either the driven or drive pulley relative to the other to install or remove the endless belts. To alleviate the problems of access or installation, segmental V belts have been proposed in which a plurality of body segments are connected end to end ultimately to form an endless belt of any desired length. Such a belt is shown, for example, in Jenkins U.S. Pat. No. 3,368,417 wherein castellations on the ends of the abutting segments are interdigited and joined by pins. Waugh U.S. Pat. No. 2,847,864 discloses a similar connection form in which straps are joined to the ends of the belt body and cooperate with suitable linking members and pin assemblies when abutted to form a connection.

SUMMARY OF THE OBJECTS OF THE PRESENT INVENTION

The present invention is directed to segmental V belts which employ reinforcing members passing through or on the segments as a means to interconnect same. It is a principle object of the invention to provide such a segmental belt having sufficient strength and flexibility to function under the necessary operating conditions.

It is another object of the present invention to provide a segmental type of V belt that can be easily field assembled to any desired length for any operating conditions. This object is accomplished by providing structure adapted quickly to interconnect the desired number of segments. This segmental belt system permits a dealer to reduce his inventory because endless belts of varying lengths are no longer necessary since these segmental belts may be field assembled to meet any length requirements.

It is yet another object of the present invention to provide a segmental V belt capable of a long and dependable life. This object is accomplished by the body reinforcement elements adding sufficient strength and providing a dependable means of interconnection. Sidewall perforations or formations may also act to lengthen the belt life.

To the accomplishment of the foregoing and related ends, the invention, then, comprises the features hereinafter fully described and particularly pointed out in the claims, the following description and the annexed drawing setting forth in detail certain illustrative embodiments of the invention, these being indicative, however, of but several of the various ways in which the principles of the invention may be employed.

BRIEF DESCRIPTION OF TE DRAWINGS

In the annexed drawings:

FIG. 1 is a side elevation showing a series of segment bodies interconnected into an endless belt by the reinforcing means illustrated in FIG. 3;

FIG. 2 is a partial perspective view of an exemplary segment body showing the internal construction of the same and also the cup-like formations on the sidewalls;

FIG. 3 is a fragmentary perspective partially in section of a segmental belt with the segments being interconnected by a common external reinforcement;

FIG. 4 is a side elevation similar to FIG. 3 showing a slightly different type of fastener embedded in the body to cooperate with the external reinforcement structure;

FIG. 5 is a fragmentary side elevation, partly in section, showing still another form of fastener embedded in the segment body cooperating with external reinforcement structure;

FIG. 6 is a fragmentary plan view of a series of segments interconnected by a common external reinforcement having lateral notches cooperating with the body fasteners;

FIG. 7 is a cross section taken along line 7—7 of FIG. 6 showing the operative relationship between the body fasteners and the lateral notches in the external reinforcement;

FIG. 8 is a fragmentary plan view showing the interconnection of the exposed abutting reinforcement members for the segmental bodies;

FIG. 9 is a section taken along line 9—9 of FIG. 8 showing the details of the connection structure used for the reinforcing members;

FIG. 10 is a section taken along line 10—10 of FIG. 9;

FIG. 11 is a fragmentary plan view of a slightly different form of connection structure used on the exposed ends of reinforcing members passed through segmental bodies;

FIG. 12 is a view similar to FIG. 11 showing the connection structure of such FIG. 11 in assembled condition;

FIG. 13 is a fragmentary side elevation showing the exposed ends of the body reinforcing strips being interfitted to form a connection; and FIG. 14 is a sectional view along line 14—14 of FIG. 13 showing the detail of the interconnection.

DESCRIPTION OF THE PREFERRED EMBODIMENTS

Referring now in more detail to the drawings and initially to FIGS. 1 through 3, a segmental V belt, indicated generally at 8, is formed from a plurality of segment bodies 10 having opposite end walls 12, a radially inner wall 14, a radially outer wall 16, and two sidewalls 18. Such body sidewalls 18 taper inwardly or converge from the radially outer wall 16 to the radially inner wall 14, with such sidewalls 18 normally being wedged into engagement with the groove sidewalls in the pulleys. The sidewalls 18 of the segment bodies may have a series of cup-like depressions 20 formed therein to increase flexibility, to dissipate heat, and to provide resistance to cracking. Instead of the cups illustrated, it will be appreciated that other sidewall configurations, such as knurling, grooves, and/or perforations, could be used for these functions.

The segment bodies 10 may be made from rubber, rubber vulcanized to fabric or cores, or from any other materials providing the necessary strength or flexibility. Additionally, the segment bodies 10 may have longitudinally extending reinforcing wires or cables 19 embedded therein to provide extra strength. Although V belts have been illustrated and described, it will be appreciated that the present invention can be used with and applies to all drive belts with all known cross sectional shapes.

Referring now to FIG. 3, a fastening stud 22 is provided adjacent each end of each segment body 10. Each of such studs 22 has a major portion of its shank embedded in the segment body 10, although a portion of such shank extends radially outwardly from the outer wall 16 of the body 10.

A continuous metallic strip or the like 23 is placed upon the radially outer surfaces 16 of a series of segment bodies 10 placed end to end. Such strip 23 is provided with a series of longitudinally spaced holes 24, with the dimensions therebetween being selected for alignment with the exposed portions of studs 22. This alignment permits the exposed stud portions to be received in the holes 24 and to extend outwardly from the strip 23. These exposed stud portions may then be positively connected to the common reinforcement strip 23 by several different means. For example, a split ring locking washer 26 may be received in an annular groove in the exposed stud shank just above the strip 23. Alternatively, and as best shown in FIG. 4, the exposed ends of the studs 22 may be provided with radially outwardly extending fingers 27 of reduced diameter that may be peaned or bent into intimate contact with the strip 23.

The length of the V belt is determined by the number of segments bodies 10 interconnected in the above fashion and the longitudinal extent of such bodies. Once the predetermined length is attained, the interconnected segment bodies are formed into endless configuration by the ends of the strip 23 being respectively connected to studs 22 at the opposite ends of the same segment body 10. The resultant endless belt is illustrated in FIG. 1 with the abutting ends of strip 23 being denoted at 23A.

Referring now to FIG. 5 and another embodiment of the invention, the radially inner surface 14 of the segment body 10 may be undercut at each end to define two longitudinally spaced, step-type recesses 28 in each body. Each such body 10 is provided with a hole 29 at each end thereof, such holes 29 communicating at one end with the step recess 28 and at the other end with the radially outer surface 16 of the body 10. The holes 29 receive bushings 30, and pins 32 extend through and slightly beyond the ends of such bushings 30. The radially outer end of each pin 32 extends through a hole 24 in the continuous external reinforcement strip 23 and is selectively connected thereto by a split locking ring 26. The radially inner end of pin 32 terminates in the stepped recess 28 and is held in such position by a second locking ring 26A. The two locking rings 26, 26A permit the pin 32 to be removed and/or replaced if desired without interfering with the driving contact with the pulley due to the flush radially inner surface presented by the ring 26A being disposed in the stepped recess 28.

It will be appreciated that the immediately adjacent pins 32 of abutting segments 10 could be interconnected by means other than the common external reinforcing strip 23 illustrated. For example, connecting links having two spaced holes therein to receive the adjacent pins 32 of abutting segment bodies 10 could be employed for such purpose by using split type locking rings selectively to connect the link to the pins. In such a connection, a link would be used on both the radially inner and outer surfaces of the segments, with the radially inner link being received in the immediately adjacent opposed step recesses 28 of the abutting ends of segment bodies 10 to avoid interference with the pulleys.

Referring now to FIG. 6, an embodiment similar to the embodiments disclosed in FIGS. 1–5 is illustrated wherein a common external reinforcement 23 is again superimposed upon the radially outer surfaces 16 of the segment bodies 10. The two sides of the strip 23 have equally spaced, inwardly directed shaped notches 35 therein, with the spacing therebetween being selected to correspond to the positioning of the segment body fasteners indicated generally at 36. As shown in FIG. 7, fasteners 36 include an upwardly extending shank portion 37 and a head 38 to retain such fastener in the body 10. The shank portion 37 passes upwardly through the notch 35 and is then bent inwardly as shown at 40 slightly to embrace the top surface of the reinforcement strip 23.

In the embodiment shown in FIGS. 8 through 10, each of the segment bodies 10 is provided with a cable or reinforcement, indicated generally at 42, having a portion 44 embedded in and extending all the way through said body. Said cable also has two exposed portions 46 respectively extending outwardly from each opposed end 12 of the body 10. The cable 42 may be embedded in the body 10 during manufacture or may be passed during installation through a longitudinally extending hole or bore of corresponding cross sectional shape provided in said body.

Referring to FIG. 9, segment bodies 10 in end to end alignment are connected by abutting the adjacent exposed portions 46 of the respective cables 42 and by then placing a longitudinally split attachment collar 47 therearound. Such attachment collar, which has outwardly splayed ends 48 contacting opposite end walls 12, is of substantially the same longitudinal extent as the sum of the two exposed cable ends 46 and commonly surrounds the same. Such attachment collar 47 has two longitudinally spaced pairs of diametrically opposed holes 49 and 50. One pair of holes 49 and 50 is aligned with the hole 52 in the exposed cable end 46 of one segment body while the other pair of holes is aligned with the hole 52 in the abutting exposed cable end 46 of the other segment body. Fasteners 53 are then passed through the aligned holes to interconnect the attachment collar 47 with the two cable end portions 46, thereby to interconnect the adjacent segment bodies 10. The interconnection with attachment collar and spaced fasteners 53 may be selectively covered, if desired, by a protective split sleeve 54.

The length of the V belt is again determined by the number of segment bodies 10 interconnected in the above fashion and the longitudinal extent of such bodies. Once the predetermined length is attained, the segments are formed and connected into endless configuration about the drive and driven pulley.

Referring now to FIGS. 11 and 12, another embodiment for interconnecting the body segments 10 by using embedded reinforcement is illustrated. In this particular embodiment, the exposed cable end portions 46 emanating from two adjacent segment bodies have been respectively inserted in oppositely facing bonnet-type nuts, identified generally at 60. Each of said nuts 60 includes a topwall 62, four sidewalls 64, and an attachment lug 65 carried by said topwall 62 and extending into the void defined within the sidewalls 64. The topwall and lug 65 have a common bore 66 extending therethrough. One of the sidewalls 64 is provided with a notched type aperture 68 to permit the terminal end portion 46 of the reinforcement cable 42 to be inserted in the bonnet nut 60 and wrapped around the attachment lug 65 as illustrated to form the connection therebetween. The oppositely facing bonnet nuts 60 are then juxtaposed as illustrated in FIG. 12 with a fastener 69 being passed through the aligned bores 66 in the two nuts 60 to connect the same together. Such fastener 69 holds the two bonnet nuts 60 tightly together and acts positively to capture and retain the terminal end portions 46 of the abutting cables therewithin, thereby to interconnect the two adjacent segment bodies 10.

Referring now to FIGS. 13 and 14, another embodiment is illustrated that uses embedded body reinforcements to interconnect the segments. In such embodiment, the individual reinforcements, indicated generally at 70, extend through the segment bodies 10 and are in the form of strip material embedded during manufacture or inserted through holes in the material during installation. If embedded during manufacture, such strips may be provided with longitudinally spaced barbs 71 positively to retain the strips in the bodies 10.

Each of such strip reinforcement members, identified generally at 70, has an embedded portion 72 longitudinally extending through the entire segment body 10 and exposed portions 74 oppositely emanating from each end of such body. Each of the exposed end portions 74 of the strips are provided with two equally transversely spaced holes 76. For assembly, one such exposed end 74 is bent to permit the two adjacent ends of two bodies in end to end relationship to be placed one on top of the other in such a manner as to vertically align the holes 76 in the respective ends. Fasteners 78 are then passed through such vertically aligned holes 76 to unite the respective reinforcement strips 72 and thus the adjacent segment bodies 10.

Although the invention has been shown and described with respect to preferred embodiments, it is obvious that equivalent alterations and modifications will occur to others skilled in the art upon the reading and understanding of this specification. The present invention includes all such equivalent alterations and modifications, and is limited only by the scope of the claims.

I claim:

1. A segmental V belt or the like comprising a plurality of body segments, adapted selectively to be joined into an endless belt of any desired length, fastener means partially embedded in said body segments and partially extending radially outwardly therefrom through the radially outer surfaces of said body segments relative to the endless belt formed therefrom, and connection means superimposed on the radially outer surfaces of said body segments to interconnect the adjacent fasteners at the ends of the adjacent segment bodies to form the same into an endless belt.

2. The segmental V belt of claim 1 wherein said connection means comprises a single strip superimposed on the radially outer surfaces of said bodies commonly to join the same into endless configuration.

3. The segmental V belt of claim 2 wherein said fastener means includes a plurality of studs.

4. The segmental V belt of claim 3 wherein said single strip is provided with a plurality of holes to receive said studs on said body segments, with said studs being secured to said strip after said reception.

5. The segmental V belt of claim 4 wherein said studs are connected to said strip by a split type locking ring received on the portions of the stud shanks extending radially outwardly of said strip.

6. The segmental V belt of claim 4 wherein said studs are provided with terminal fingers of decreased thickness extending radially outwardly of said strip, with said fingers being bent into intimate surface contact with said strip to form the connection therebetween.

7. The V belt of claim 4 wherein said body segments are each provided with internal reinforcement extending from one end to the other and with means on the sidewalls of said body segments to increase flexibility and to dissipate heat.

8. The segmental V belt of claim 2 wherein the edges of the single strip are provided with correspondingly spaced notches to receive the exposed portions of the fastener means, the fastener means being bent after reception into intimate contact with the radially outer surface of the single strip.

9. The segmental V belt of claim 1 wherein said fastener means comprises a plurality of pins, each of such pins extending through the body segments, with the radially inner end of each pin being received in a step recess in the radially inner surface of the body to present a flush inner surface.

10. The segmental V belt of claim 9 wherein said connection means comprises a single strip superimposed on the radially outer surfaces of said bodies, said strip having holes to receive said pins which are secured to said strip after reception.

11. The segmental V belt of claim 10 wherein each of the pins is provided with a selectively removable locking ring at each end, the radially outer locking ring engaging the strip and the radially inner locking ring being positioned in said step recess.

12. A segmental V belt or the like comprising a plurality of body segments, individual flat strips extending through and being embedded in each of said body segments and having end portions exposed at each end of said body portions, and means to interconnect adjacent ends of said flat strips which are formed to receive such means to interconnect, thereby to assemble an endless belt therefrom of any desired length.

13. The segmental V belt of claim 12 wherein said reinforcement strips are perforated at spaced locations to form barbs that bite into the segment body to provide longitudinal stability for said reinforcement strips relative to said segment bodies.

14. The segmental V belt of claim 12 wherein each of said exposed strip ends are provided with at least one hole and said strip ends are complementally arranged to put the respective holes of the adjacent ends into alignment for passage of the interconnecting means therethrough.

15. A segmental V belt or the like comprising a plurality of body segments, at least one cable or the like passed through a similar number of longitudinal holes formed in and extending through each of said body segments from one end to the other, said cable having ene portions exposed at each end of said body portion, and means to interconnect adjacent ends of said cables for adjacent body segments to form an endless belt therefrom of any desired length.

16. The segmental V belt of claim 15 wherein the exposed terminal ends of said cable or the like are formed to receive said interconnecting means.

17. The segmental V belt of claim 15 wherein the interconnecting means are enclosed in a protective sleeve.

18. A segmental V belt or the like comprising a plurality of body segments having sidewalls with means thereon to increase flexibility and to dissipate heat, individual reinforcement means extending through each of said body segments and having end portions exposed at each end of said body portions, and means to interconnect adjacent ends of said individual reinforcement means to form an endless belt therefrom of any desired length.

* * * * *